United States Patent
Zager

[11] Patent Number: 5,831,536
[45] Date of Patent: Nov. 3, 1998

[54] FUEL TANK ALARM SYSTEM

[75] Inventor: Raymond Zager, Ponte Vedra Beach, Fla.

[73] Assignee: Ray Zager & Company, Ponte Vedra Beach, Fla.

[21] Appl. No.: 605,771

[22] Filed: Feb. 22, 1996

[51] Int. Cl.[6] .................................................. G08B 21/00
[52] U.S. Cl. ......................... 340/623; 340/450; 340/625; 73/308; 73/317
[58] Field of Search .................................... 340/623, 450, 340/450.2, 450.3, 618, 625; 73/290 R, 305, 306, 307, 317, 308, 328

[56] References Cited

U.S. PATENT DOCUMENTS

| | | | |
|---|---|---|---|
| 3,820,098 | 6/1974 | Demyon et al. | 340/625 |
| 4,290,059 | 9/1981 | Noyes et al. | 340/624 |
| 4,398,186 | 8/1983 | Statz | 340/616 |
| 5,023,806 | 6/1991 | Patel | 340/625 |
| 5,140,303 | 8/1992 | Meyer | 340/625 |
| 5,281,858 | 1/1994 | Langved | 340/625 |
| 5,374,790 | 12/1994 | Horvath | 340/625 |
| 5,426,271 | 6/1995 | Clark et al. | 340/625 |
| 5,506,564 | 4/1996 | Hargest | 340/450 |

Primary Examiner—Jeffery Hofsass
Assistant Examiner—Davetta Woods
Attorney, Agent, or Firm—Arthur G. Yeager

[57] ABSTRACT

An alarm system to warn those pumping fuel into remote tanks that the fuel level is at the top of the tank, and thus prevent overflowing. This system is particularly useful for filling tanks in boats.

18 Claims, 3 Drawing Sheets

FUEL TANK ALARM SYSTEM

TECHNICAL FIELD

This invention is in the technical field of electrical alarm systems to warn of the approach to overflowing while filling a tank, e.g., a fuel tank.

BACKGROUND OF THE INVENTION

There are many occasions for filling a tank with a liquid which will cause serious pollution or unsafe conditions if an overflow occurs. A typical example is the filling of fuel tanks of boats in the water. Many times the fuel pump controls are remote from the fuel tank being filled, and visible controls are not possible. Therefore, it is necessary to provide some type of sensing system that recognizes the fuel level and warns the operator when that level reaches a predetermined point. Usually a float means is involved which triggers an alarming sound or a light when the float reaches a selected level.

There have not been available to the public fuel tanks with built-in systems to accomplish this purpose. Nothing has been developed that is suitable for use in easily converting a fuel tank with no overflow warning system into one having such a system. In other words, these systems are not suitable for retrofitting operations.

It is an object of this invention to provide a fuel tank alarm system that can readily be incorporated into a previously constructed tank. It is another object of this invention to provide an alarm system with a float means that is readily available for repair. Still other objects will become apparent from the more detailed description which follows.

BRIEF SUMMARY OF THE INVENTION

This invention relates to an alarm system for signaling that the liquid in a remote tank has reached a selected level, the system comprising a float means actuating a magnetic switch in an electric circuit including an alarm means, power source, and said magnetic switch; said float means and said magnetic switch being suspended inside said tank from a pipe conduit passing through an opening in the wall of said tank and being affixed thereto by a retainer plate outside said wall and clamped thereto by screws piercing said plate and said wall, a flexible liquid seal means surrounding said pipe conduit and pressed against said opening.

In a specific and preferred embodiment of the invention, the liquid is a fuel, and the tanks are fuel tanks on a marine craft. In another specific embodiment the alarm system includes a slender magnetic switch with a float means attached, and a threaded pipe having an internal diameter larger enough for the magnetic switch and float means to pass therethrough, with the threaded pipe extending outwardly of the tank and being clamped thereto with a support plate screwed to the tank wall and including an O-ring or a gasket to seal the space between the threaded pipe and the tank wall.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

This invention is best understood by reference to the attached drawings wherein the component parts are numbered, the same number being applied to the same component in different drawings.

Figure 1:
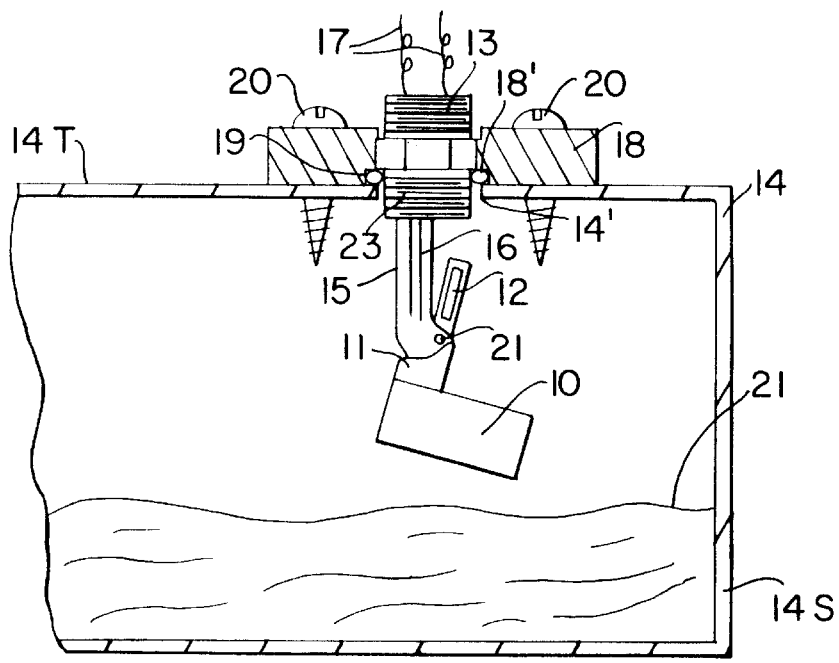
FIG. 1 is a partial cross-sectional view in elevation of a fuel tank employing the alarm system of this invention by entering the tank through the top horizontal wall of the tank.
Figure 2:
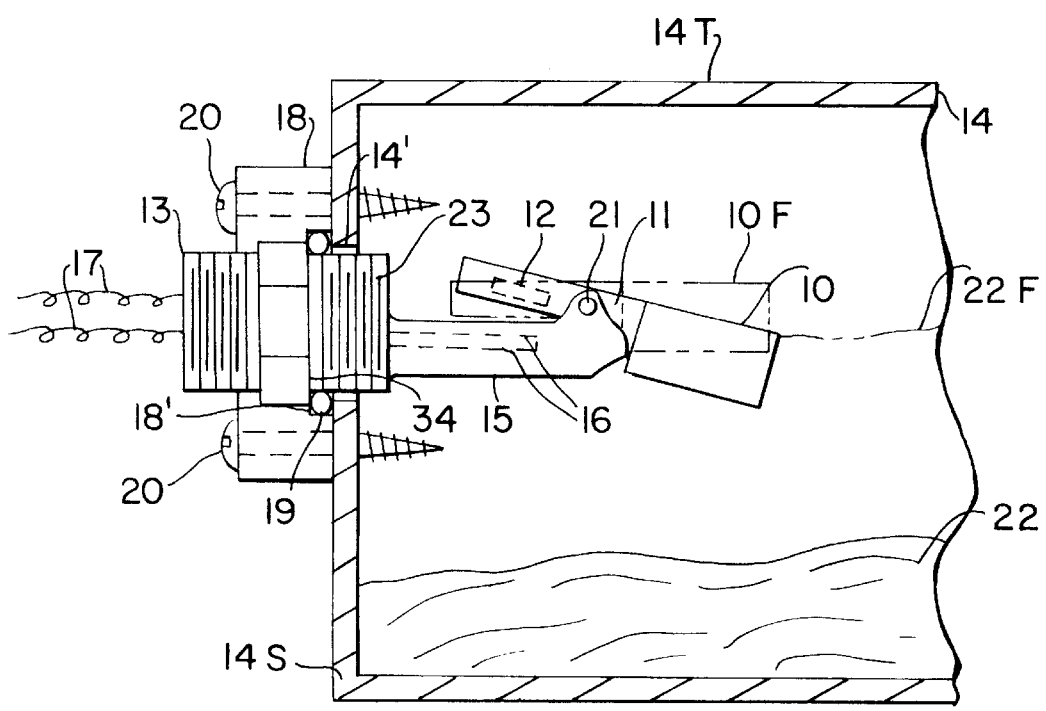
FIG. 2 is a partial cross-sectional view in elevation of a fuel tank employing the alarm system of this invention by entering the tank through a vertical side wall of the tank.

FIGS. 1 and 2 show two arrangements for introducing the alarm system of this invention into an existing fuel tank 14. In FIG. 1 the float device 10 and its associated equipment is incorporated into the tank 14 through the top horizontal wall 14T. In FIG. 2 the float device 10 and its associated equipment is incorporated into the tank 14 through a vertical side wall 14S near the upper of the tank.

A circular opening 14' is cut through the wall 14S, 14T where the device 10 is to be installed. A magnetic switch housing 13 may include external threads to be screwed into corresponding threads of opening 14'. Housing 13 extends inwardly of tank 14 and supports a sealed reed switch container 15 containing two parallel flexible electrical conducting reeds. Reed switch container 15 is connected to float 10 which is movable closer to or further away from the reed switch in container 15. Magnetic switches with attached float means are well-known prior art devices that have different physical characteristics, but which are functionally similar. In some instances the float is a sliding sleeve around the reed switch container, the sleeve including a magnet which comes closer and closer to the reed switch as the float rises higher and higher. In another instance as shown in FIGS. 1 and 2, the float 10 is pivoted at pin 21 with respect to reed switch container 15. A magnet 12 is located in the float support 11. As the liquid level in tank 14 rises, float 10 rises causing magnet 12 to move closer and closer to reed switch 16, finally causing the reeds to touch each other closing the electric circuit and activating the alarm 25. Of course, one of the reeds must carry a magnet or be of a magnetically responsive material. In the instance shown in FIGS. 1 and 2, magnet 12 may repel the adjacent reed 15 or attract the non-adjacent reed 15 in order to close one reed 15 on the other reed 15.

Figure 3:
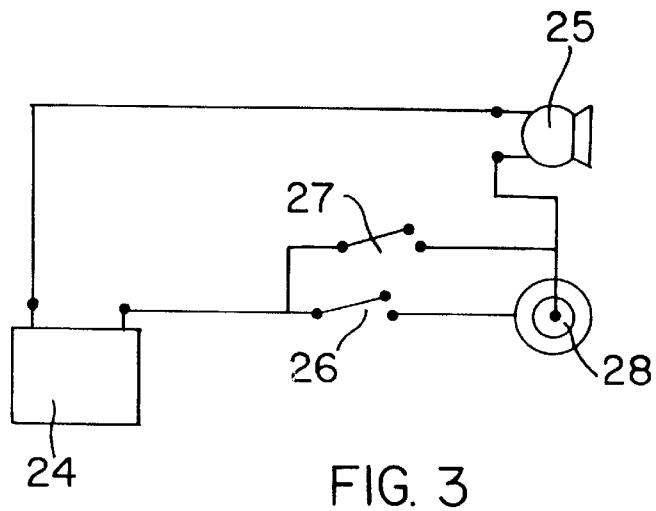
FIG. 3 is an electric circuit diagram of the alarm system of this invention for one tank and wherein the power source is a dry cell battery.
Figure 4:
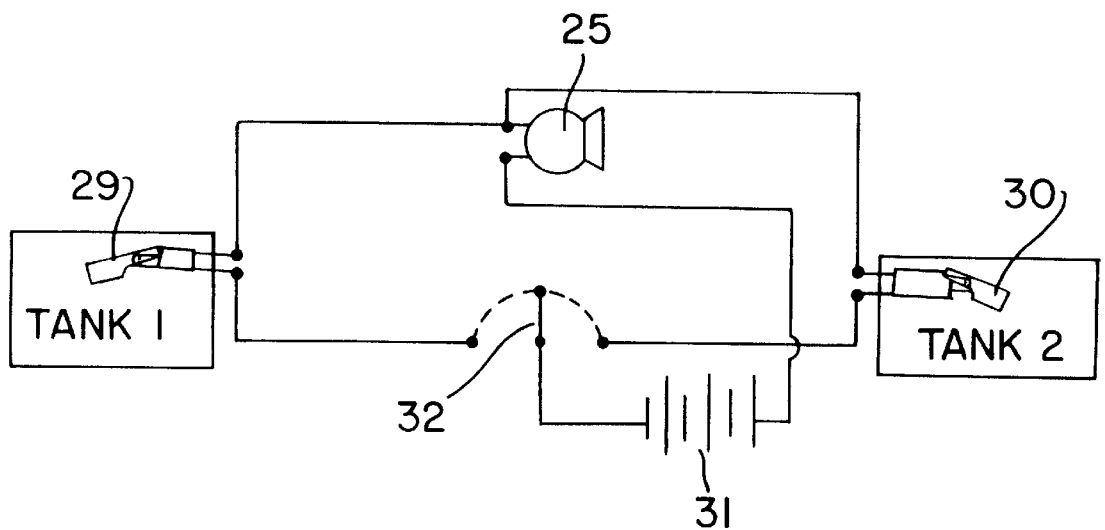
FIG. 4 is an electric circuit diagram of the alarm system of this invention for two tanks and wherein the power source is a wet cell battery, such as a direct current (DC) battery.

The electric circuits for these systems are shown in FIGS. 3 and 4. In FIG. 3 there is a simplified system for retrofitting an existing tank and employing a dry cell battery source of power. The circuit includes the magnetic switch 28, the alarm (horn, buzzer, and/or light) 25 and a dry cell battery 24. An on/off switch 26 completes the circuit when the switch 26 is closed and allows the reed switch 28 to close and sound the alarm 25 when the float 10 rises to a preselected level illustrated by broken lines 10F. The switch 27 provides a testing circuit to test the power of battery 24 to make certain that the system is functioning properly before filling the tank 14 with fuel.

In FIG. 4 there is an arrangement showing the use of the alarm system in two tanks on a marine craft that are protected against inadvertent overflowing by the system of this invention. Tank 1 contains a float and magnetic switch 29. Tank 2 contains a float and magnetic switch 30. In this arrangement which typically would apply to a marine craft with two fuel tanks the power source is the main battery 31 of the craft, perhaps a 12-volt wet cell battery 31,. A double throw on/off switch 32 allows the operator to move the switch from the off position (as shown in FIG. 4) to the right or to the left to complete the circuit to Tank 2 or to Tank 1, respectively. Thus, each of the two tanks can be protected against inadvertent overflowing by a single system selectively applicable to the tank being filled.

It is particularly important and critical to this invention to note that the magnetic switch housing can be affixed to any tank without having access to the inside of the tank to support the magnetic switch. Prior art devices have been operable only when there is a backing plate or releasable nut on both sides of a tank wall clamping the magnetic switch housing therebetween, and bolts may be employed which extend through both plates and the tank wall and fastened by nuts. In this invention one need only cut out the proper size opening in a tank wall, tap the hole, and screw into that opening the magnetic switch housing 13 by means of its external threads. However, in the preferred embodiment, a backing support plate 18 is screwed tightly against the wall with self-tapping thread cutting screws 20 extending through the support plate 18 and the tank wall 14T, 14S. This firmly supports the magnetic switch housing 13 and needs only a seal 19, such as an O-ring, around the magnetic switch housing 13 to prevent fuel leakage or the leakage of fumes. The backing support plate 18 has a follower ledge 18' to apply pressure to the O-ring 19 to squeeze it tightly between the wall surrounding the opening 14' and the ledge 18' and/or a shoulder 34 on the magnetic switch housing 13 extending outwardly of opening 14' in the wall. It should be noted that in the case of the arrangement of FIG. 2 the level of liquid inside the tank 14 when it is full, as at 22 F, would leak out through the interior of magnetic switch housing 13 except it is totally enclosed and sealed.

Figure 5:
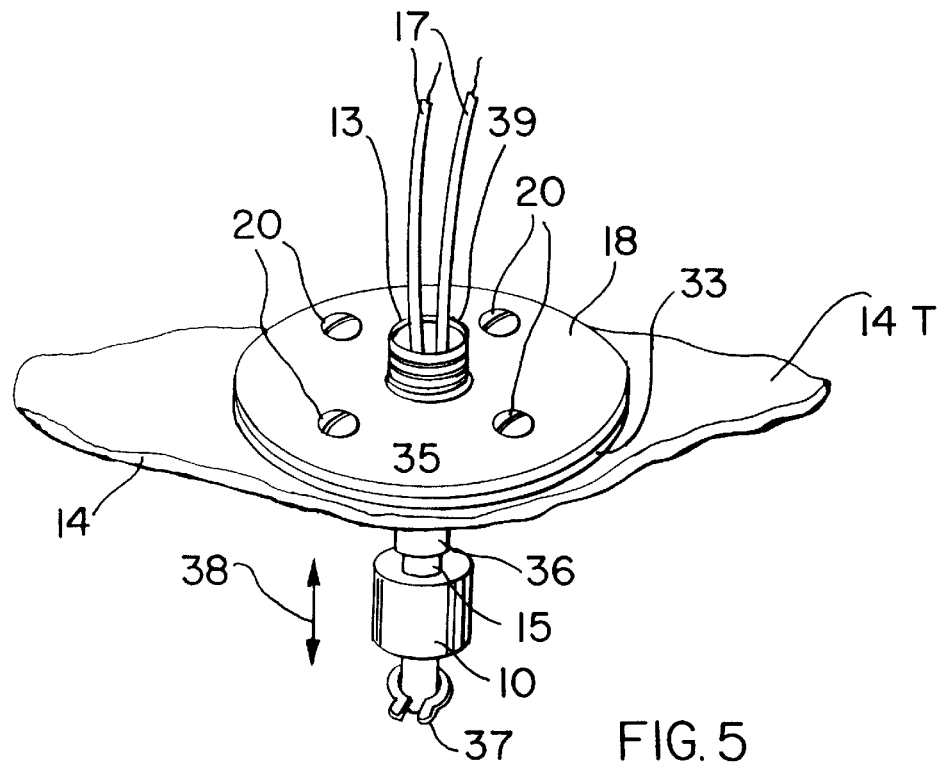
FIG. 5 shows a second embodiment of a float system mounted on top of the fuel tank.

FIG. 5 shows a second embodiment of the arrangement depicted in FIG. 1. In FIG. 5 the float 10 is a cylindrical object which is made of materials which will float on the fuel, gasoline or diesel, whatever the fluid is in the tank where the float 10 is to be used. Float 10 has a central axial bore which is large enough to be slidable over cylindrical housing 15 which contains the reed switch 16 internally thereof. Float 10 contains a magnet which activates the reed switch 16 as float 10 moves upward on housing 15. The sliding movement of float 10 is indicated by double arrow 38. A ledge stop 36 prevents float 10 from sliding upward beyond ledge 36, and a spring clip stop 37, held in grooves on housing 15 prevents float 10 from sliding downward beyond clip stop 37. Above housing 15 is a pipe nipple 35 to conduct wires 17 from the sealed reed switch to either of the electric circuits, as shown in FIGS. 3 and 4. A gasket 33 lies against the fuel tank wall 14 and a retainer plate 18 backs up the gasket. These two layers, 18 and 33 are screwed to tank 14 by spaced screws 20 and properly sealed to the wall 14. Shoulder 34 is beneath plate 18 and not seen in this view. This arrangement allows one to cut a large enough hole in the fuel tank wall 14T or 14S to place float 10, clip stop 37, switch container 15, and associated components inside the fuel tank, and to fasten it tightly in place in a leakproof manner without ever needing to reach inside the fuel tank to secure housing 13 from the inside.

Figure 6:
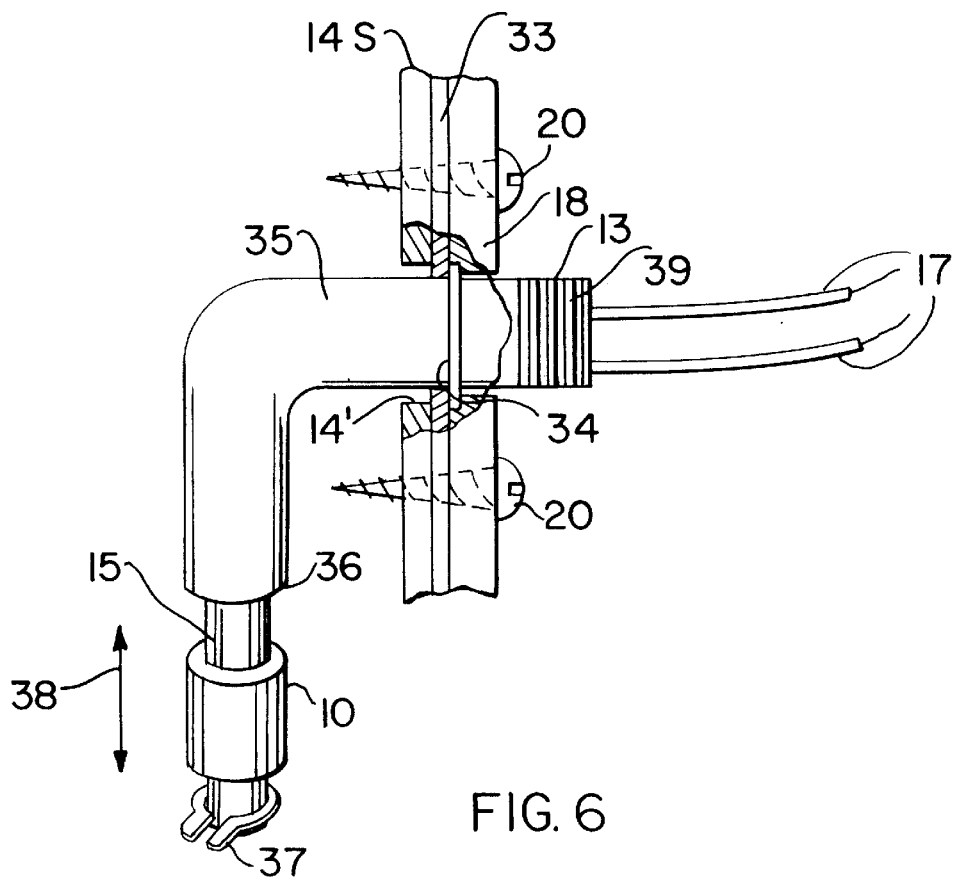
FIG. 6 shows a second embodiment of a float system mounted on the vertical side wall of a fuel tank.

FIG. 6 shows a second embodiment to the arrangement of FIG. 2 wherein the float system is put into the fuel tank through a hole cut in a vertical side wall 14S of the fuel tank 14. The same components are employed here as those described above with respect to FIG. 5. In this instance the pipe nipple 35 is a right angle bend length of pipe. The reed switch is housed at 15 and the float 10 slides in the direction of arrows 38 between a ledge stop 36 and a spring clip 37. Retainer plate 18 and gasket 33 are held tightly against flanged shoulder 34 and tank wall 14 by screws 20. It should be noted that FIGS. 4 and 5 show a slightly different arrangement than those of FIGS. 1 and 2. In FIGS. 1 and 2 the pipe conductor 13 has threads 23 which may screw into threaded opening 14' in wall 14. In FIGS. 5 and 6 the pipe conductor does not screw into wall 14 but it does include a shoulder 34 larger than the opening 14'.

This invention is particularly applicable to the filling of fuel tanks, but is equally applicable to the filling of any tank with any liquid wherein a float means is employed to sense the liquid level at any selected point. That level need not be at overflow conditions, but may be at any selected level. A plurality of tanks may be controlled from a central location if there is a selector switch which can be set to connect the alarm 25 to each selected tank and its magnetic switch and float means.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A retrofit overflow alarm system for signaling that the level of a flammable liquid in a remote tank has reached a preselected level to prevent spillage thereof, the system comprising a magnetic switch and a float means attached to said magnetic switch in an electric circuit including an alarm means, a power source, and said magnetic switch; said float means and said magnetic switch being suspended inside said tank through an opening in a top horizontal wall of said tank, a retainer plate, a liquid proof housing for said switch for retrofitting and extending through said opening of said tank; said housing having an outer portion extending outwardly of said wall and an inner portion within said tank, said housing having an outwardly disposed flange larger than said opening and extending laterally of said opening and located outwardly of said tank and being clamped to said wall by said retainer plate attached to and located outwardly of said tank and being clamped to said wall by said retainer plate attached to and located outwardly of said wall by screws piercing said plate and said wall, a single flexible flammable liquid resistant liquid seal suitable for use in a flammable environment surrounding said housing inwardly of said flange and pressed between said plate and said flange and outwardly of said wall of said tank.

2. The system of claim 1 wherein said liquid seal is an elastomeric O-ring.

3. The system of claim 1 wherein said liquid seal is a flat gasket.

4. The system of claim 1 wherein said magnetic switch includes a liquidproof recess in said housing containing a reed switch which closes when said float means moves upwardly causing an internal magnet to move closer to a magnetically attracted reed of said reed switch.

5. The system of claim 1 wherein said liquid is a fuel.

6. The system of claim 1 wherein said power source is a dry cell battery.

7. The system of claim 1 wherein said power source is a direct current (DC) wet cell battery.

8. The system of claim 1 wherein said wall is a top horizontal wall of said tank.

9. The system of claim 1 on a marine craft having at least two remote fuel tanks, each of which has an independent identical float means and magnetic switch in said electric circuit, said circuit further including a selector switch to select one of said fuel tanks to be electrically joined to said alarm means and to said power source and said power source being a storage battery of a marine craft.

10. A retrofit kit for installing an alarm system on a marine craft having at least two fuel tanks, the kit comprising a reed switch in a housing, said housing including a flange larger than an opening in a fuel tank wall through which said housing is to be inserted, the switch being operable by a magnet-containing movable float adapted to be positioned inside a fuel tank near the top thereof, a conductor pipe connecting the reed switch housing to the space outside the fuel tank, a retainer plate and gasket sealing means adjacent said flange outside of the fuel tank adapted to seal the conductor pipe to the fuel tank and prevent any leakage around the pipe as it extends from inside to outside of the fuel tank, thread cutting screws, and lengths of two electric wires to connect the reed switch to the electrical system of the marine craft.

11. The kit of claim 10 which additionally includes sound and light emitters activatable by the alarm system, and a switch control adapted to operate the alarm system selectively with each fuel tank connected to the alarm system.

12. In a marine craft having at least one remote fuel tank and retrofit alarm system for signaling that the fuel in said tank has reached a preselected level to prevent fuel overflow, said system comprising an electric circuit having a power source, a magnetic switch and an alarm, a float disposed within said tank, said tank having a top horizontal wall with an opening therethrough, suspension means passing through said opening and supporting said float adjacent said preselected level within said tank, said suspension means including a liquidproof housing for said magnetic switch being retrofitted to and extending outwardly of said wall through said opening, a retainer plate located outwardly of said wall through said opening, a retainer plate located outwardly of said tank, a flexible flammable liquid resistant liquid seal suitable for use in a flammable environment located outwardly of said tank and surrounding said opening, said housing having an outer portion extending outwardly of said wall and an inner portion within said tank, said housing further including a flange larger than said opening and extending laterally outwardly of said opening and adjacent the outside of said wall, said seal being sandwiched between said wall, said flange, and said retainer plate to seal between said opening and said wall outwardly thereof and spaced screws piercing said retainer plate and said wall to compress said liquid seal to prevent leakage of the fuel from said tank through said opening.

13. In the marine craft of claim 12 wherein said housing includes a liquidproof recess containing a reed switch which closes when said float moves upwardly causing a magnet to move closer to and magnetically attract one reed of said reed switch to close against another same reed thereby providing a complete circuit from said power source to said alarm.

14. In the marine craft of claim 12 wherein said wall is a top horizontal wall of said tank.

15. In the marine craft of claim 12 wherein said power source is a dry cell battery whereby said power source and alarm are self-contained.

16. In the marine craft of claim 12 wherein said power source is a direct current (DC) wet cell battery of said craft.

17. A retrofit kit for installing an alarm system on a marine craft having at least one fuel tank to prevent fuel spillage when filling same, the kit comprising an alarm, a movable float carrying a magnet and positionable within said tank near its top and a housing, a magnetic reed switch disposed in said housing, said switch being closed by said magnet carried by said float when fuel in said tank reaches a preselected level near its top, a liquid impervious suspension means passing through an opening in a wall of said tank and connecting said housing to said fuel tank, said suspension means including a retainer plate and a single seal adapted to surround said opening to prevent any leakage around said opening as said suspension means extends from inside to outside of said tank, a pair of electric wires to connect said reed switch between said alarm and an electrical system of a marine craft, said housing including a flange larger than said opening in said wall and extending laterally outwardly of said opening and being located outside of said tank and adjacent said wall and said sealing means, and a pair of self tapping thread cutting screws spaced on said retainer plate for connection thereof to said wall of said tank and sandwiching said single seal squeezingly between said retainer plate and said flange and the outside of said wall.

18. The kit of claim 17 which additionally includes another identical reed switch and float connected to another fuel tank, and a manually operable switch to control said alarm to be activated selectively with each of said reed switches associated respectively to said fuel tank being filled with fuel.

* * * * *